(12) United States Patent
Dibiaso et al.

(10) Patent No.: US 7,822,149 B2
(45) Date of Patent: *Oct. 26, 2010

(54) METHOD TO ENABLE SINGLE FREQUENCY NETWORK OPTIMIZATION

(75) Inventors: Eric A. Dibiaso, Kokomo, IN (US);
Michael L. Hiatt, Jr., Westfield, IN (US); Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 934 days.

This patent is subject to a terminal disclaimer.

(21) Appl. No.: 11/143,044

(22) Filed: Jun. 2, 2005

(65) Prior Publication Data

US 2006/0274855 A1  Dec. 7, 2006

(51) Int. Cl.
*H04L 27/20* (2006.01)
(52) U.S. Cl. .................. 375/308; 375/295; 375/299; 375/302; 375/316; 375/322
(58) Field of Classification Search .................. 375/135, 375/137, 146–147, 150, 211, 212–215, 219, 375/220–223, 302, 308, 322, 329, 350–355, 375/295, 299, 316, 342–343, 306
See application file for complete search history.

(56) References Cited

U.S. PATENT DOCUMENTS

| 6,745,005 | B1* | 6/2004 | Lou et al. ................... 455/13.1 |
| 2004/0146123 | A1* | 7/2004 | Lai ............................. 375/329 |
| 2005/0015162 | A1* | 1/2005 | Omura et al. ................. 700/94 |
| 2005/0089068 | A1* | 4/2005 | Sun et al. .................... 370/509 |
| 2005/0111581 | A1* | 5/2005 | Walker et al. ............... 375/308 |
| 2006/0227857 | A1* | 10/2006 | Gaal ........................... 375/150 |
| 2006/0264191 | A1* | 11/2006 | Lai ............................. 455/127.2 |
| 2008/0062906 | A1* | 3/2008 | Baker et al. ................. 370/315 |

OTHER PUBLICATIONS

EP Search Report dated Dec. 19, 2007.
Jiang H et al: "Hierarchical Modulation for Upgrading Digital Broadcast Systems" IEEE Transactions on Broadcasting, IEEE Service Center, Piscataway, NJ, US, vol. 51, No. 2, May 23, 2005, pp. 223-229, XP011132694 ISSN: 0018-9316.
Morimoto M et al: "Joint on-board resource sharing and hierarchical modulation scheme for satellite communication" Global Telecommunications Conference, 1995. Conference Record. Communication Theory Mini-Conference, Globecom '95., IEEE Singapore Nov. 13-17, 1995, New York, NY, USA, IEEE, US, vol. 3, Nov. 13, 1995, pp. 1662-1666, XP010164544 ISBN: 0-7803-2509-5.
Kannan Ramchandran: "Multiresolution Broadcast for Digital HDTV Using Joint Source/Channel Coding" IEEE Journal on Selected Areas in Communications, IEEE Service Center, Piscataway, NJ, US, vol. 11, No. 1, Jan. 1993 pp. 6-22, XP000377993 ISSN: 0733-8716.

* cited by examiner

*Primary Examiner*—Shuwang Liu
*Assistant Examiner*—Hirdepal Singh
(74) *Attorney, Agent, or Firm*—Jimmy L. Funke

(57) ABSTRACT

Additional data may be added to the current SDARS satellite signals as a phase and/or amplitude offset from the legacy quadrature phase shift keying (QPSK) modulated data and transmitted by the SDAR terrestrial repeaters. However, in the case where a legacy receiver architecture for a differential modulation system outputs angular/phase differences between carriers, the phase and/or amplitude information appears as distortion to the legacy receiver. The present invention provides a method for optimizing the SDARS infrastructure more efficiently by allowing independent adjustment of the phase and/or amplitude offset (610) at each terrestrial site. The present invention provides a method for adjusting the performance of each signal together or separately as needed.

20 Claims, 6 Drawing Sheets

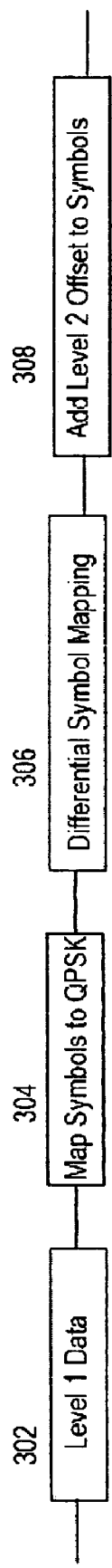
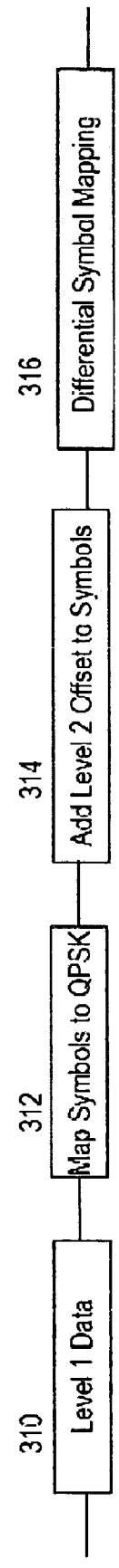
Figure 3A
Figure 3B

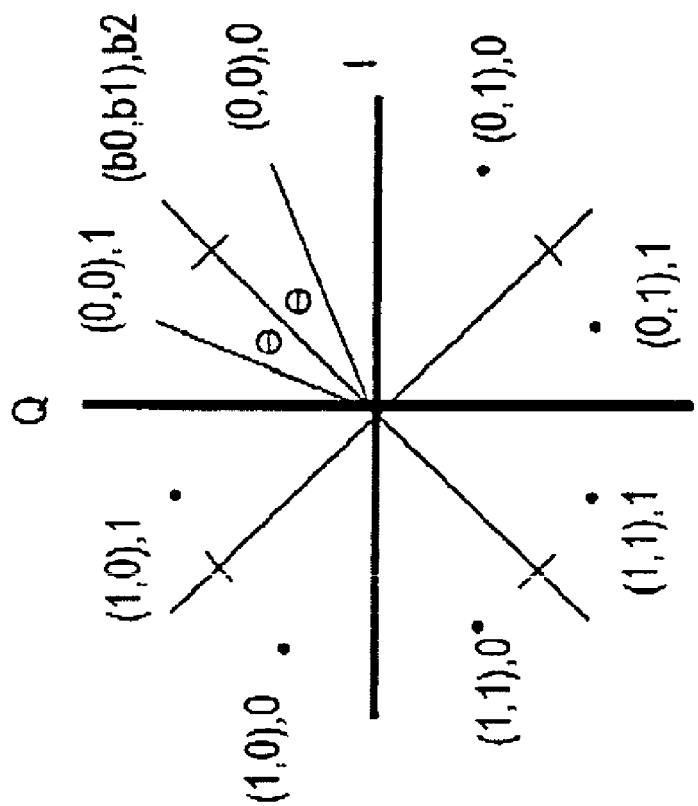
Figure 5. Gray Coded
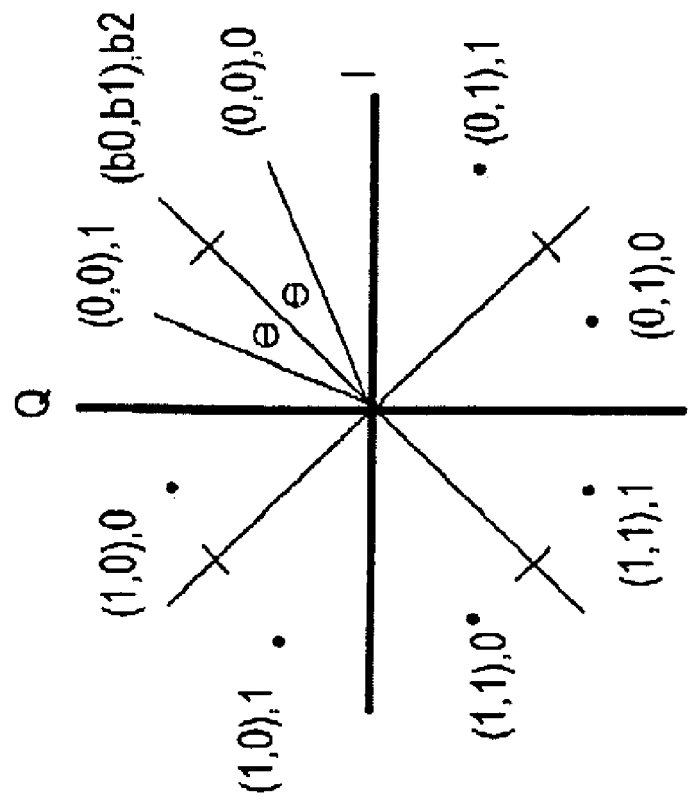
Figure 4. Non-Gray Coded

METHOD TO ENABLE SINGLE FREQUENCY NETWORK OPTIMIZATION

TECHNICAL BACKGROUND

The present invention generally relates to the transmission of digital data, and more particularly, to the transmission of digital data in a satellite digital audio radio ("SDAR") system.

BACKGROUND OF THE INVENTION

In October of 1997, the Federal Communications Commission (FCC) granted two national satellite radio broadcast licenses. In doing so, the FCC allocated 25 megahertz (MHz) of the electromagnetic spectrum for satellite digital broadcasting, 12.5 MHz of which are owned by XM Satellite Radio, Inc. of Washington, D.C. ("XM"), and 12.5 MHz of which are owned by Sirius Satellite Radio, Inc. of New York City, N.Y. ("Sirius"). Both companies provide subscription-based digital audio that is transmitted from communication satellites, and the services provided by these—and eventually other—companies (i.e., SDAR companies) are capable of being transmitted to both mobile and fixed receivers on the ground.

In the XM satellite system, two communication satellites are present in a geostationary orbit, one satellite at a specific longitude and the other at a specific latitude. Accordingly, the satellites always seem to be position above the same spot on the earth. In the Sirius satellite system, however, three communication satellites are present that orbit the earth at a specific longitude and while moving across latitudes and, relative to the northern hemisphere, rise and set once a day. Consequently, two of the three satellites are "visible" to receivers in the United States at all times. Since both satellite systems provide audio data to mobile receivers in urban canyons and other high population density areas with limited line-of-sight satellite coverage, both systems use terrestrial repeaters to receive and re-broadcast the same audio data that is transmitted by the respective satellite systems.

Mobile wireless systems operate under unique and challenging channel conditions. Factors such as multipath, intersymbol interference, and Doppler shift make the wireless channel unpredictable. These factors are all related to the variability that is introduced by the mobility of the user and the wide range of environments that might be encountered. Mobile data systems, such as the SDAR system, face challenges such as these as a result of the vagaries of the wireless environment.

SUMMARY OF THE INVENTION

There are techniques to add hierarchical modulation in both satellite and terrestrial signals. Most commonly used for stationary systems, these are typically straightforward phase and magnitude adjustments. Some are also designed prior to system deployment, such as terrestrial digital video broadcasting (DVB) hierarchical modulation.

SDAR systems employ a network of transmitters (or terrestrial repeaters) on the ground known as a single frequency network (SFN), all broadcasting the same material on the same channel, offering coverage over an extended geographical region. The terrestrial repeater networks supplement coverage in many areas because satellite reception requires a line-of-sight signal path. The terrestrial repeaters receive and re-broadcast the same audio data that is transmitted by the respective satellite systems.

Additional data may be added to the current SDARS terrestrial signals to minimize degradation in a D-MPSK modulation system. The additional data may also be added to the current SDARS satellite signals as a phase and/or amplitude offset from the legacy quadrature phase shift keying (QPSK) modulated data. This additional data is then received and re-transmitted by the SDAR terrestrial repeaters. This extra data is received as the phase error from the QPSK demodulator. This implementation of receiving the additional data is possible because the SDARS receiver is coherent with the QPSK satellite symbol. This means the receiver must accurately know the frequency and phase of the transmitted signal. However, differential modulation (D-MPSK), as transmitted by the conventional SDAR terrestrial repeaters, only requires a non-coherent receiver to decode the signal. Therefore, adding the hierarchical data into the signal of the terrestrial repeaters may be done to optimize the performance of both the primary and additional data for legacy systems.

With the advent of backward compatible modulation schemes for SDARS, there is a need for methods to optimize an existing SFN. As additional data is added to a signal as a phase and/or amplitude offset, this additional information appears as distortion to legacy receivers. The amount of distortion added impacts the overall performance of both Level 1 and Level 2 data. An SFN network may have one or more repeaters transmitting the same signal. Therefore, complete "re-tuning" of the existing infrastructure may be required. This could include transmit power adjustments and/or relocation of existing repeaters and/or additional repeaters. The SDAR system infrastructure may be optimized more efficiently by allowing independent adjustment of the phase and/or amplitude offset at each terrestrial site.

Problems arise when performing modulation techniques in mobile applications. Problems that might arise include multipath, intersymbol interference (ISI), and Doppler shift. Multipath refers to the phenomenon that occurs as a transmitted signal is reflected by objects in the environment between the transmitter and the user. While the signal is en route, buildings, trees, vehicles, and other items get in the way and cause the signal to bounce in different directions. A portion of the signal might go directly to the destination, and another part may bounce from a vehicle to a building, and then to the destination. As a result, some of the signal will encounter delay and travel longer paths to the receiver resulting in random signal fades.

Intersymbol interference (ISI) describes the situation where the energy from one symbol spills over into another symbol resulting in signal distortion. ISI is caused by the frequency selectivity (time dispersion) of the channel due to multipath propagation. Doppler shift describes the random changes in the channel introduced as a result of a user's mobility and the relative motion of objects in the channel. Doppler has the effect of shifting, or spreading, the frequency components of a signal resulting in signal fades.

Some terrestrial audio broadcast systems use differential multiple phase shift keying (D-MPSK) modulation (e.g., D-BPSK, D-QPSK, pi/4 D-QPSK). Standard differential modulation techniques like D-MPSK encode the data in the phase difference between two consecutive PSK symbols. A D-MPSK modulation technique may be accomplished by transmitting the phase information across adjacent orthogonal frequency-division multiplexing (OFDM) symbols or adjacent frequency subcarriers. OFDM works by splitting the radio signal into multiple smaller sub-signals that are then transmitted simultaneously at different frequencies to the receiver. OFDM reduces interference in signal transmissions. In an OFDM system the differential modulation may be across adjacent frequency subcarriers in one OFDM symbol or on the frequency subcarrier across two adjacent OFDM symbols. In either case, estimates due to phase offsets may be used to improve performance.

Additional data may be added to the current SDARS satellite signals as a phase and/or amplitude offset from the legacy quadrature phase shift keying (QPSK) modulated data and transmitted by the SDAR terrestrial repeaters. However, in the case where a legacy receiver architecture for a differential modulation system outputs angular/phase differences between carriers, the phase and/or amplitude information appears as distortion to the legacy receiver. The present invention provides a method for allowing independent adjustment of the phase and/or amplitude offset at each terrestrial site, thereby optimizing the infrastructure more efficiently. The performance of each signal can be adjusted together or separately as needed. This enables a much easier optimization of the network.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIGS. 3A and 3B are flow chart diagrams of techniques for adding additional throughput to a legacy signal.

FIGS. 4 and 5 are quadrature diagrams depicting the modulation techniques for adding additional data as a signal offset.

Figure 1:
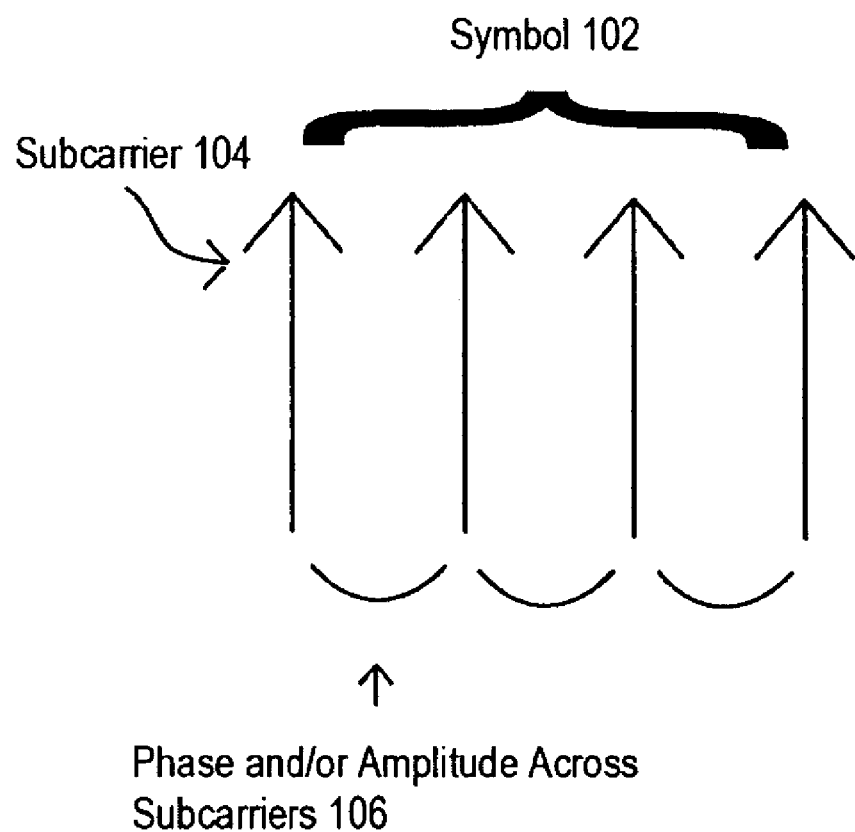
FIG. 1 is a schematic diagram of a technique for adding additional throughput by transmitting the phase and/or amplitude information across adjacent frequency subcarriers.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted accordance with the following definitions.

"Orthogonal frequency division multiplexing" or "OFDM" hereinafter refers to the communications technique that divides a communications channel into a number of equally spaced frequency bands. A subcarrier carrying a portion of the data is transmitted in each band. Each subcarrier is independent of every other subcarrier.

"Phase shift keying" or "PSK" hereinafter refers to a method of transmitting and receiving digital signals in which the phase of a transmitted signal is varied to convey information. Phase may also be an expression of relative displacement between or among waves having the same frequency.

"Quadrature phase shift keying" or "QPSK" hereinafter refers to a digital frequency modulation technique that is both easy to implement and fairly resistant to noise. With QPSK, the carrier undergoes four changes in phase (four symbols) and can thus represent two binary bits of data per symbol. Although this may seem insignificant initially, a modulation scheme has now been supposed that enables a carrier to transmit two bits of information instead of one, thus effectively doubling the bandwidth of the carrier.

"Hierarchical modulation" hereinafter describes when two separate data or bit streams are modulated onto a single data stream. Essentially, one data stream is superimposed upon, mapped on, or embedded within another data stream. The data streams may have different data rates. Broadcasters of SDAR services may use the hierarchical modulation streams to target different types of receivers.

"First level data," "primary data" or "Level 1 data" hereinafter refers to existing data that may be interpreted by current (i.e., "legacy") SDAR receivers. First level data may either perform the same as or differently from second level, or secondary, data.

"Second level data," "secondary data," "Level 2 data," and/or "hierarchical data" hereinafter refers to the additional data that is superimposed on the first level data to create a hierarchical modulated data stream. Second level data may either perform the same as (e.g., lower data rate) or perform differently from (e.g., higher data rate) first level data.

"Single Frequency Network" or "SFN" hereinafter refers to a network configuration that utilizes a set of transmitters spread throughout a given territory (a city, a region or even a country) temporally synchronized and transmitting at the same frequency.

SDAR systems employ a network of terrestrial repeaters known as a single frequency network (SFN), all broadcasting the same material at the same frequency. The terrestrial repeaters receive and re-broadcast the same audio data that is transmitted by the respective satellite systems. Signals transmitted by the conventional SDAR terrestrial repeaters use differential modulation. Adding a hierarchical modulation to the conventional SDAR terrestrial repeaters will add additional degradation to legacy receivers in the SFN.

In the case where a legacy receiver architecture for a differential modulation system outputs angular/phase differences between carriers, the hierarchical phase and/or amplitude information appears as distortion to the legacy receiver. The present invention provides a method for optimizing the SDARS infrastructure more efficiently by allowing independent adjustment of the phase and/or amplitude offset at each terrestrial site. The method allows for adjusting the degree offset when adding a secondary signal to symbols from a D-MPSK modulated signal as an offset to produce an offset signal. Adjusting the performance of each signal may be done together or separately as needed.

A primary signal having MPSK modulation may be received and a secondary signal added to symbols from the MPSK modulated signal as an offset to produce an offset signal. This new signal may then be transmitted using an orthogonal frequency-division multiplexing (OFDM) transmission system. The adding of additional throughput to Level 2 data by transmitting the phase and/or amplitude information across adjacent frequency subcarriers is depicted in a schematic format as shown in FIG. 1. OFDM works by splitting the radio signal into multiple smaller sub-signals that are then transmitted simultaneously at different frequencies to the receiver. In an OFDM system the differential modulation may be across adjacent frequency subcarriers 106 in one OFDM symbol 102. Estimates due to phase offsets may be used to improve performance.

In one example, the legacy signal that has been quadrature phase shift keying (QPSK) modulated by two bits per symbol may be received and the Level 2 offset may be added to the symbols as a phase offset from the QPSK modulated data. Differential multiple phase shift keying (D-MPSK) is then accomplished by transmitting the phase information across adjacent frequency subcarriers in an OFDM system.

The implementation of a phase offset between two frequency subcarriers has shown through simulations to produce the least degradation to the legacy system. Details of this exemplary implementation are shown in the following example. The example depicts this method on a pi/4 D-QPSK system. The original Level 1 bits and their corresponding constellation mapping are show below:

| Level 1 bits → | 1 0 | 1 1 | 0 0 | 0 1 | |
|---|---|---|---|---|---|
| QPSK symbols → | 135° | −135° | 45° | −45° | |
| Pi/4 D-QPSK symbols → | #1(ref) | #2 | #3 | #4 | #5 (Dsym) |
| | | 45° | 180° | 45° | 90° | 45° |

The above symbols would be transmitted in the legacy system. Level 1 bits are the two bits intended to be transmitted. QPSK symbols indicate the associated phase shift. The modulation used is pi/4 shifted Differential Quadrature Phase Shift Keying (pi/4-D-QPSK). In conventional QPSK there are four possible constellation points and the phase change can be 0, ±pi/2 or pi. In pi/4 DQPSK modulation, there are eight possible constellation points. Dsym specifies a symbol has been defined. To add the additional data (Level 2) to the transmission, the following steps are performed:

| Level 2 bits → | 0 | 0 | 1 | 0 |
|---|---|---|---|---|
| Level 2 symbol → (offset) | −15° | −15° | +15° | −15° |

A +/−15 degree offset from the original QPSK symbol is expected to provide the best performance in this embodiment, although there are variations in optimal performance depending on hardware and software implementations of the present invention. Therefore, the following equations have been developed to give a +/−15 degree offset for Differential Modulation:

$Tsym(1)=Dsym(1)$(reference)

$Tsym(n)=Dsym(n)-Dsym(n-1)+offset+Tsym(n-1)$; for n=2:# of subcarriers

Tsym represents the symbol time period. The first equation represents a reference point for the first subcarrier. The second equation gives a +/−15 degree offset for Differential Modulation for the remaining subcarriers.

The following example shows the new transmitted symbols calculated from the above equation:

| Pi/4 D-QPSK symbols → | #1(ref) | #2 | #3 | #4 | #5 (Dsym) |
|---|---|---|---|---|---|
| | | 45° | 165° | 15° | 75° | 15° |

At the receiver (without noise), the differential demodulator would output the following symbols (#2-#1 . . . ):

| Received symbols → | 120° | −150° | 60° | — | 60° |
|---|---|---|---|---|---|
| Error from QPSK symbols → | −15° | −15° | +15° | — | 15° |

As shown above, the error from the received QPSK symbols exactly matches the Level 2 phase offset added at the transmitter. This method is thought to produce the smallest degradation to the original pi/4 D-QPSK data in this embodiment.

Figure 2:
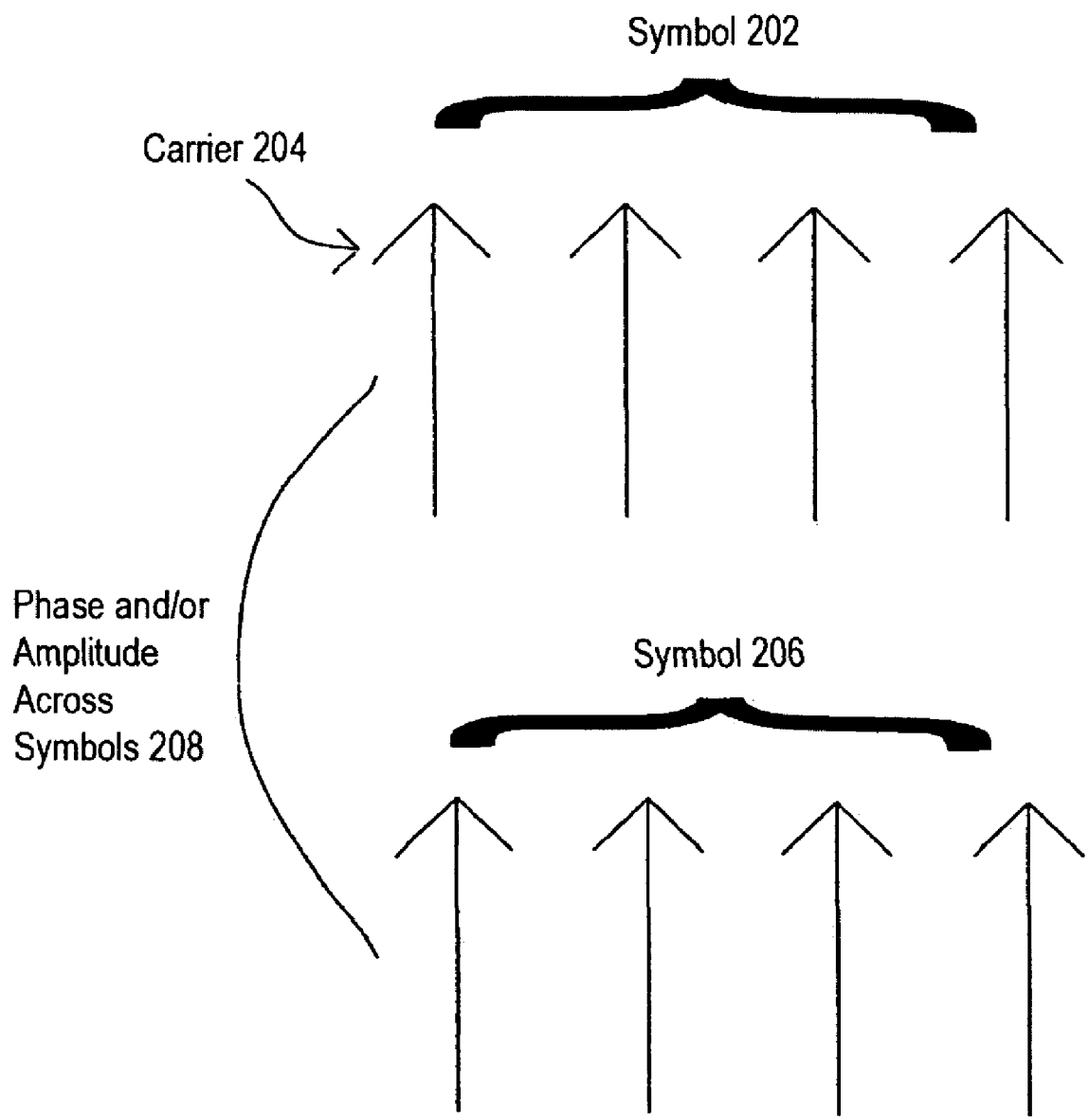
FIG. 2 is a schematic diagram of a technique for adding additional throughput by transmitting the phase and/or amplitude information across adjacent OFDM symbols.

The adding of additional throughput to Level 2 data by transmitting the phase information across adjacent OFDM symbols is shown in FIG. 2. Furthermore, the performance of the additional data may be improved by modifying the Level 2 bit mapping method shown in the example. The mapping above was simply:

| Level 2 Bit | Phase Offset |
|---|---|
| 0 | −15° |
| 1 | +15° |

A final constellation where the Level 2 bits (b2) are not gray coded as shown FIG. 4 below. For Level 2 gray coding, the mapping technique as shown in FIG. 5 may be used. In the above example, the mapping technique optimizes the performance of the additional data.

| Level 2 Bit | Dsym(n) - Dsym(n-1) | Phase Offset |
|---|---|---|
| 0 | 45°, −135° | −15° |
| 0 | 135°, −45° | +15° |
| 1 | 45°, −135° | +15° |
| 1 | 135°, −45° | −15° |

The adding of additional throughput to Level 2 data may be accomplished by transmitting the phase information across adjacent orthogonal frequency-division multiplexing (OFDM) symbols, as depicted in FIG. 2. The Level 2 offset is added to the symbols as a phase offset from the legacy QPSK modulated data. Differential multiple phase shift keying (D-MPSK) is then accomplished by transmitting the phase information across adjacent OFDM symbols in an OFDM system. FIG. 2 depicts the phase information 208 being transmitted across adjacent OFDM symbols 202, 206 to minimize degradation.

The transmission of the additional data may be done as an amplitude offset between the same frequency subcarriers on two adjacent OFDM symbols or between adjacent subcarriers on the same OFDM symbol. The implementation of the amplitude offset is similar to the phase offset except for the exceptions highlighted below.

To identically compare the phase and amplitude offset methods, the offset distance was calculated using the following equation: Amplitude offset=sin(phase offset). The major difference is the mapping of the Level 2 bits. The amplitude remains the same if the Level 2 bit is a zero, and it toggles if the Level 2 bit is a one, as shown below.

| Level 2 Bit | Amplitude of Tsym(n-1) | Amplitude of Tsym(n) |
|---|---|---|
| 0 | −Amplitude Offset | −Amplitude Offset |
| 0 | +Amplitude Offset | +Amplitude Offset |
| 1 | −Amplitude Offset | +Amplitude Offset |
| 1 | +Amplitude Offset | −Amplitude Offset |

A combination of the two methods (phase offset and amplitude offset) described above may be used to add the additional data throughput to the signal transmitted by a SDARS terrestrial repeater to minimize degradation. This technique further degrades the performance of the Level 1 legacy data (by decreasing Level 1 symbol energy), but will increase the performance of the Level 2 data (by increasing Level 2 symbol energy). This technique may be accomplished by transmitting the same Level 2 information twice (both with amplitude and phase offset) and combining them in the receiver. The combining may be done using Maximum Ration Combining (MRC) or by utilizing some type of complementary code on the Level 2 data. By using a complementary code, different parity bits may be transmitted with the amplitude and phase offsets and combined in the decoder to improve the error correction capability of the code.

The described techniques may be utilized in adding additional data to minimize degradation in a D-MPSK hierarchical modulation. The techniques provide for adding the additional throughput to the Level 2 data by transmitting the phase information across adjacent OFDM symbols or adjacent frequency subcarriers. The techniques are shown using the flow diagrams in FIGS. 3A and 3B.

In FIG. 3A, the primary Level 1 data 302 may be mapped to symbols using quadrature phase shift keying (QPSK) modulation (step 304). The symbols may then be modulated using a differential multiple phase shift keying (D-MPSK) modulation technique (step 306). The additional data may be accomplished by adding a secondary signal to symbols from the D-MPSK modulated signal as an offset to produce an offset signal (step 308).

The technique depicted in FIG. 3B is similar. The primary Level 1 data 310 may be mapped to symbols using quadrature phase shift keying (QPSK) modulation (step 312). The additional data may be accomplished by adding a secondary signal to symbols from the QPSK modulated signal as an offset to produce an offset signal (step 314). The offset signal may then be transmitted using D-MPSK in an orthogonal frequency-division multiplexing (OFDM) transmission system (step 316).

The above techniques may be utilized in adding additional data to minimize degradation in a D-MPSK hierarchical modulation. The techniques provide for adding the additional throughput to the Level 2 data by transmitting the phase information across adjacent OFDM symbols or adjacent frequency subcarriers. The transmission of the additional data may also be done as an amplitude offset between the same frequency subcarriers on two adjacent OFDM symbols or between adjacent subcarriers on the same OFDM symbol. A third option involves the use of a combination of the two methods (phase offset and amplitude offset) in transmitting the additional Level 2 data.

As additional data is added to a signal as a phase and/or amplitude offset, this additional information appears as distortion to legacy receivers. The amount of distortion added impacts the overall performance of both Level 1 and Level 2 data. An SFN network may have one or more terrestrial repeaters transmitting the same signal. Therefore, complete "re-tuning" of the existing infrastructure may be required. Using conventional technology, such re-tuning might involve adjusting the power level of existing repeaters, relocating existing repeaters, and/or creating additional repeaters to balance the signal patterns. Unfortunately, the adjustment of one repeater may effect the reception of receivers in different locations in a dependent manner, so only through a series of trial and error would a re-balancing effort succeed. Such modifications may only work temporarily, and changes in conditions (such as weather patterns or new buildings or other infrastructure changes) may create new imbalances that may need further correction.

Figure 6:
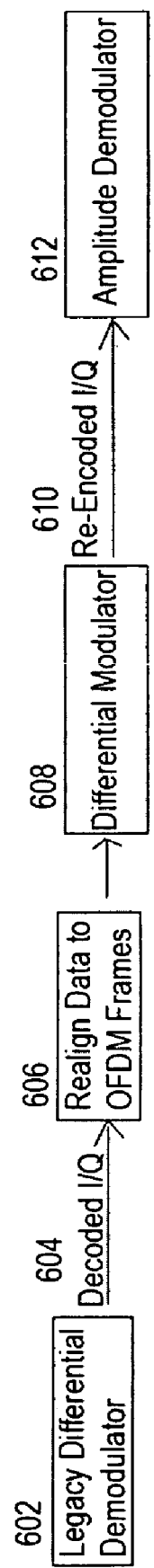
FIG. 6 is a flow chart diagram of a technique for adjusting the degree offset of the offset signal.

The present invention provides a method for optimizing the SDARS infrastructure more efficiently by allowing independent adjustment of the phase and/or amplitude offset at each terrestrial site, as depicted in FIG. 6. While the provision of the additional data is maintained by a repeater using the method of FIG. 6, the exact phase and/or amplitude variance may be individually tuned over the entire network of repeaters, either alone or in conjunction with multiple repeaters. Such variation may be dictated because of actual measurement and feedback, or may be supposed based on simulations (and possibly further tuned when variations created by simulation are tested in the field In one embodiment of the present invention, the method includes receiving the primary Level 1 data (step 602) and mapping the Level 1 data to symbols using QPSK modulation (step 604). The symbols may then be modulated using a differential quadrature phase shift keying (D-QPSK) modulation technique (step 606). The method further includes the addition of the Level 2 offset (step 608) according to the secondary data signal (step 603). This offset can then be adjusted (step 610) depending on simulations or field tests for optimizing the SFN (step 612). Adding a secondary signal to symbols from a D-QPSK modulated signal as an offset produces the offset signal. Adding a secondary signal to symbols from a QPSK modulated signal as an offset may also produce an offset signal. The offset may be a phase and/or amplitude offset. The present invention provides a method for optimizing the SDARS infrastructure more efficiently by allowing independent adjustment of the phase and/or amplitude offset at each terrestrial site. Each signal may be adjusted together or separately as needed to improve performance.

Figure 7:
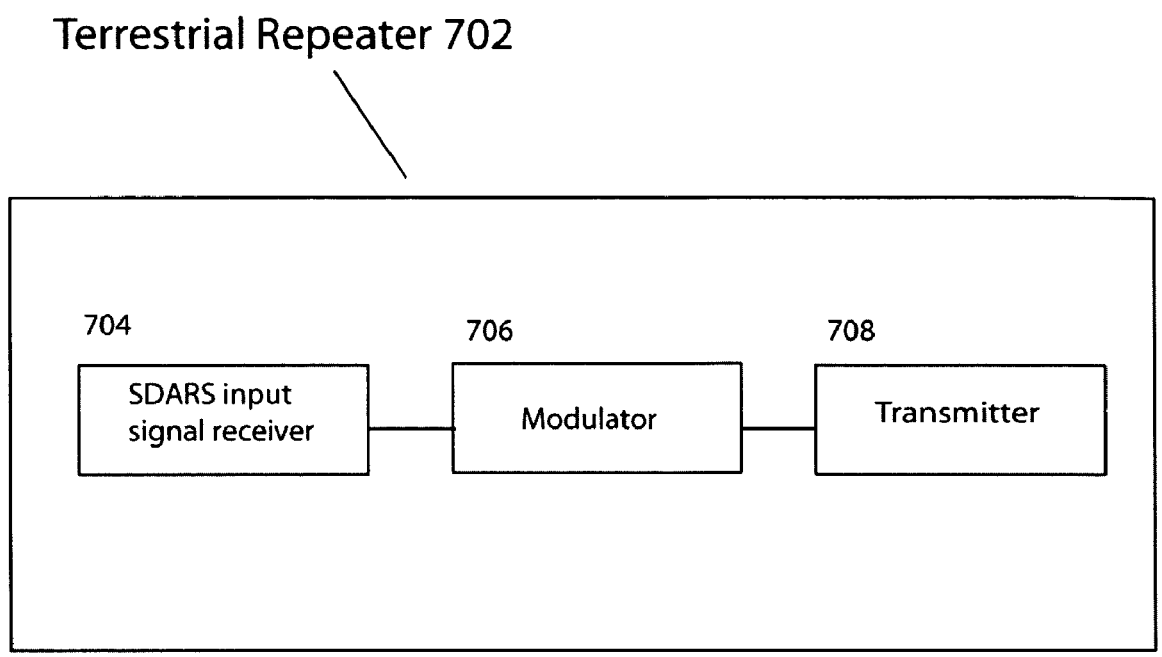
FIG. 7 is a schematic representation of a terrestrial repeater with an apparatus for adjusting the degree offset of the offset signal.

One exemplary form of the present invention is shown in FIG. 7. In the depicted embodiment, repeater 702 is used in optimizing a network in a digital transmission system includes receiver 704 having circuitry to demodulate both first and second level data. Modulator 706 adds the secondary signal to symbols from a D-MPSK modulated signal as an offset to produce an offset signal. The Modulator 706 is also adapted to adjust the degree offset including programming capable of implementing the method of FIG. 6. After the degree of the offset is determined, modulator 706 sends the final offset signal to transmitter 708, which transmits the offset signal.

We claim:

1. A method for optimizing a single frequency network in a digital transmission system, comprising the steps of:
   a. creating a differential multiple phase shift keying (D-MPSK) signal based on primary data;
   b. hierarchical modulating the primary data and secondary data onto a single data stream, wherein the secondary data is imposed on the D-MPSK signal as an offset, such that an offset signal is produced;

c. adjusting the offset of the secondary data with respect to symbols from the D-MPSK signal, such that the offset of the secondary data is independently adjusted at each terrestrial repeater of the digital transmission system; and d. transmitting the offset signal with the secondary data being imposed as the adjusted offset from the primary data.

2. The method of claim 1 wherein the offset to be adjusted is a phase offset.

3. The method of claim 1 wherein the offset to be adjusted is an amplitude offset.

4. The method of claim 1 wherein the offset to be adjusted is a combination phase and amplitude offset.

5. The method of claim 1, wherein the offset is adjusted as a function of at least one of operating measurements and feedback.

6. The method of claim 1, wherein the digital transmission system is a satellite digital radio (SDAR) architecture system.

7. The method of claim 1, wherein the offset signal is transmitted utilizing an orthogonal frequency-division multiplexing (OFDM) transmission system.

8. A method for optimizing a single frequency network in a digital transmission system, comprising the steps of:

a. creating a quadrature phase shift keying (QPSK) signal based on primary data;

b. hierarchical modulating the primary data and secondary data onto a single data stream, wherein the secondary data is imposed on the QPSK signal as an offset, such that an offset signal is produced;

c. adjusting the degree offset when adding the secondary data with respect to symbols from a QPSK modulated signal as the offset, such that the offset of the secondary data is independently adjusted at each terrestrial repeater of the digital transmission system; and d. transmitting the offset signal with the secondary data being imposed as the adjusted offset from the primary data.

9. The method of claim 8 further wherein the offset to be adjusted is a phase offset.

10. The method of claim 8 wherein the offset to be adjusted is an amplitude offset.

11. The method of claim 8 wherein the offset to be adjusted is a combination phase and amplitude offset.

12. The method of claim 8, wherein the adjusted offset is a +/−15 degree offset from the primary data.

13. The method of claim 8, wherein the digital transmission system is a satellite digital radio (SDAR) architecture system.

14. The method of claim 8, wherein the offset signal is transmitted utilizing an orthogonal frequency-division multiplexing (OFDM) transmission system.

15. An apparatus for optimizing a single frequency network in a digital transmission system, said apparatus comprising:

a. a digital transmission receiver adapted to detect differential multiple phase shift keying (D-MPSK) modulated primary signals that comprise primary data;

b. circuitry coupled to the receiver, adapted to hierarchical modulate the primary data and a secondary data, wherein the secondary data is imposed on the D-MPSK signal as an offset to produce an offset signal;

c. circuitry coupled to the receiver, the circuitry adapted to adjust the degree offset when adding the secondary data with respect to symbols from a D-MPSK modulated signal as the offset, wherein the offset to be adjusted is at least one of an amplitude offset and a phase offset, such that the offset of the secondary data is independently adjusted at each terrestrial repeater of the digital transmission system and the spacing of the terrestrial repeaters is optimized; and d. a transmitter coupled to the digital transmission system, the transmitter adapted to transmit the offset signal with the secondary data being imposed as the adjusted offset from the primary data.

16. The apparatus of claim 15 wherein the offset to be adjusted is a combination phase and amplitude offset.

17. The apparatus of claim 15, wherein the offset is adjusted as a function of at least one of operating measurements and feedback.

18. An apparatus for optimizing a single frequency network in a digital transmission system, the single frequency network having a configuration that utilizes a set of transmitters spread throughout a territory temporarily synchronized and transmitting at the same frequency, said apparatus comprising:

a. a digital transmission receiver adapted to detect quadrature phase shift keying (QPSK) modulated primary signals that comprise primary data;

b. circuitry coupled to the receiver, the circuitry adapted to hierarchical modulate the primary data and a secondary data stream, wherein the secondary data is imposed on the QPSK signal as an offset, such that an offset signal is produced;

c. circuitry coupled to the receiver, the circuitry adapted to adjust the degree offset when adding the secondary data with respect to symbols from a QPSK modulated signal as the offset, wherein the offset to be adjusted is at least one of an amplitude offset and a phase offset, such that the offset of the secondary data is independently adjusted at each terrestrial repeater of the digital transmission system and the spacing of the terrestrial repeaters is optimized; and d. a transmitter coupled to the digital transmission system, the transmitter adapted to transmit the offset signal with the secondary data being imposed as the adjusted offset from the primary data.

19. The apparatus of claim 18 wherein the offset to be adjusted is a combination phase and amplitude offset.

20. The apparatus of claim 18, wherein the adjusted offset is a +/−15 degree offset from the primary data.

* * * * *